(12) United States Patent
Jansen (10) Patent No.: US 10,615,904 B2
(45) Date of Patent: Apr. 7, 2020

(54) METHOD AND APPARATUS FOR ENABLING A SINGLE FIBER-WORKING ON AN OPTICAL FIBER

(71) Applicant: ADVA Optical Networking SE, Meiningen OT Dreissigacker (DE)

(72) Inventor: Sander Jansen, Germering (DE)

(73) Assignee: ADVA Optical Networking SE, Meiningen OT Dreissigacker (DE)

(*) Notice: Subject to any disclaimer, the term of this patent is extended or adjusted under 35 U.S.C. 154(b) by 0 days.

(21) Appl. No.: 16/024,406

(22) Filed: Jun. 29, 2018

(65) Prior Publication Data

US 2019/0020437 A1    Jan. 17, 2019

(30) Foreign Application Priority Data

Jul. 17, 2017  (EP) .................................. 17181587

(51) Int. Cl.
| | | |
|---|---|---|
| *H04J 14/02* | (2006.01) | |
| *H04B 10/2507* | (2013.01) | |
| *H04B 10/2563* | (2013.01) | |

(52) U.S. Cl.
CPC ........ *H04J 14/023* (2013.01); *H04B 10/2563* (2013.01); *H04B 10/25073* (2013.01); *H04J 14/0208* (2013.01); *H04J 14/0265* (2013.01)

(58) Field of Classification Search
CPC .. H04J 14/023; H04J 14/0208; H04J 14/0265; H04J 14/04; H04J 14/02; H04B 10/25073; H04B 10/2563; H04B 10/04; H04B 10/2581; H04B 10/2507; G02F 1/35; G02F 1/01
USPC ................................. 398/79, 187, 49, 43, 44
See application file for complete search history.

(56) References Cited

U.S. PATENT DOCUMENTS

| | | | | |
|---|---|---|---|---|
| 5,023,863 A | * | 6/1991 | Masuda | ............. H04Q 11/0005 398/45 |
| 5,619,368 A | * | 4/1997 | Swanson | ................ G02F 1/3536 359/326 |
| 6,359,725 B1 | * | 3/2002 | Islam | ....................... H01S 3/302 359/334 |

(Continued)

FOREIGN PATENT DOCUMENTS

WO    WO 2012/110081 A1    8/2012

OTHER PUBLICATIONS

Extended European Search Report for European Patent Application Serial No. 17181587.1 (dated Jan. 19, 2018).

*Primary Examiner* — Abbas H Alagheband
(74) *Attorney, Agent, or Firm* — Jenkins, Wilson, Taylor & Hunt, P.A.

(57) ABSTRACT

A method and apparatus for transporting data through a single optical fiber (SOF) the method comprising the steps of providing (S1) transmission Tx, wavelength division multiplexed, WDM, data channels and reception Rx, wavelength division multiplexed, WDM, data channels having the same frequency grid with frequency gaps between the WDM data channels; frequency shifting (S2) the Tx-WDM data channels and/or the Rx-WDM data channels to avoid spectral overlap between the Tx-WDM data channels and the Rx-WDM data channels; combining (S3) the frequency shifted Tx-WDM data channels and the frequency shifted Rx-WDM data channels; and transporting (S4) data via the combined WDM data channels through said single optical fiber (SOF) in opposite directions.

15 Claims, 7 Drawing Sheets

(56) References Cited

U.S. PATENT DOCUMENTS

| | | | | |
|---|---|---|---|---|
| 9,621,297 | B2* | 4/2017 | Cavaliere | H04B 10/2503 |
| 2003/0044111 | A1* | 3/2003 | Oberland | H04B 10/506 |
| | | | | 385/24 |
| 2009/0060497 | A1* | 3/2009 | Way | H04B 10/675 |
| | | | | 398/27 |
| 2011/0158644 | A1* | 6/2011 | Cavaliere | H04J 14/0227 |
| | | | | 398/43 |
| 2012/0243880 | A1* | 9/2012 | Oda | H04B 10/506 |
| | | | | 398/187 |
| 2013/0064542 | A1* | 3/2013 | Eiselt | H01S 5/0687 |
| | | | | 398/34 |
| 2013/0315524 | A1* | 11/2013 | Saida | H04B 10/5053 |
| | | | | 385/3 |
| 2013/0315598 | A1* | 11/2013 | Marom | H04J 14/0224 |
| | | | | 398/79 |
| 2014/0314415 | A1* | 10/2014 | Vassilieva | H04J 14/0227 |
| | | | | 398/76 |
| 2015/0086200 | A1* | 3/2015 | Xie | H04B 10/2581 |
| | | | | 398/44 |
| 2015/0304036 | A1* | 10/2015 | Huang | H04B 10/25073 |
| | | | | 398/79 |
| 2016/0087749 | A1* | 3/2016 | Lawin | H04Q 11/0066 |
| | | | | 398/49 |
| 2017/0214488 | A1* | 7/2017 | Vassilieva | H04B 10/50 |
| 2017/0353242 | A1* | 12/2017 | Mansouri Rad | H04B 3/32 |

* cited by examiner

METHOD AND APPARATUS FOR ENABLING A SINGLE FIBER-WORKING ON AN OPTICAL FIBER

PRIORITY CLAIM

This application claims the benefit of European Patent Application No. 17181587.1, filed Jul. 17, 2017; the disclosure of which is incorporated herein by reference in its entirety.

TECHNICAL BACKGROUND

Single fiber-working, SFW, networks allow to reduce the number of required fibers in a system. Various DWDM and CWDM SFW architectures are available. All conventional SFW architectures have in common that the transmit wavelength is different from the receive wavelength. It is necessary to transmit and receive a signal at a different wavelength because otherwise fiber reflections of the optical fiber can result in severe transmission penalties. This has in particular a negative impact on 100G+ transponders using coherent detection. Because of space and power restrictions, 100G+ transponders use the same laser on the transmission side and reception side. In dual fiber-working systems, this does not pose a restriction on its operation as the transmit and receive wavelength are typically the same. However, in a single fiber-working, SFW, system, the transmit and receive wavelength must be different and as such these 100G+ transponders cannot be used in a single fiber-working architecture. Accordingly, there is a need to provide a method and an apparatus for enabling a single fiber-working where data is transportable through a single optical fiber SOF which allows the use of dual fiber-working, DFW, transponders.

SUMMARY OF THE INVENTION

The invention provides according to the first aspect of the present invention a method for transporting data through a single optical fiber, SOF, comprising the steps of:
providing transmission wavelength division multiplexed data channels and reception wavelength division multiplexed data channels having the same frequency grid with frequency gaps between the WDM data channels,
frequency shifting the transmission wavelength division multiplexed data channels and/or the reception wavelength division multiplexed data channels to avoid spectral overlap between the transmission wavelength division multiplexed data channels and the reception wavelength division multiplexed data channels,
combining the frequency shifted transmission wavelength division multiplexed data channels and the frequency shifted reception wavelength division multiplexed data channels and
transporting data via the combined wavelength division multiplexed data channels through said single optical fiber in opposite directions.

In a possible embodiment of the method according to the first aspect of the present invention, the transmission wavelength division multiplexed data channels and the reception wavelength division multiplexed data channels are frequency shifted with a frequency shift of at least the Nyquist spectral bandwidth of the respective WDM data channels.

In a further possible embodiment of the method according to the first aspect of the present invention, the frequency shifted transmission wavelength division multiplexed data channels and the frequency shifted reception wavelength division multiplexed data channels are combined by interleaving the frequency shifted transmission wavelength division multiplexed data channels and the frequency shifted reception wavelength division multiplexed data channels.

In a further possible embodiment of the method according to the first aspect of the present invention, the frequency shifted transmission wavelength division multiplexed data channels and the frequency shifted reception wavelength division multiplexed data channels are combined by coupling the frequency shifted transmission wavelength division multiplexed data channels and the frequency shifted reception wavelength division multiplexed data channels by means of a passive optical interleaver or a passive optical coupler.

In a further possible embodiment of the method according to the first aspect of the present invention, all transmission wavelength division multiplexed data channels and/or all reception wavelength division multiplexed data channels are frequency shifted simultaneously to avoid spectral overlap between the transmission wavelength division multiplexed data channels and the reception wavelength division multiplexed data channels on said single optical fiber.

In a further possible embodiment of the method according to the first aspect of the present invention, the transmission wavelength division multiplexed data channels and the reception wavelength division multiplexed data channels are frequency shifted by a frequency shifter.

In a still further possible embodiment of the method according to the first aspect of the present invention, the transmission wavelength division multiplexed data channels are frequency upshifted by a frequency shifter on a transmission side of the single optical fiber to avoid spectral overlap between the transmission wavelength division multiplexed data channels and the reception wavelength division multiplexed data channels.

In a still further possible embodiment of the method according to the first aspect of the present invention, the transmission wavelength division multiplexed data channels are frequency upshifted positively with a frequency shift by a first frequency shifter on a transmission side of said single optical fiber and frequency downshifted back negatively with the same frequency shift by a second frequency shifter on the reception side of said single optical fiber.

In a still further possible embodiment of the method according to the first aspect of the present invention, both the transmission wavelength division multiplexed data channels and the reception wavelength division multiplexed data channels are frequency shifted relative to each other by a first frequency shifter on a transmission side of said single optical fiber and by a second frequency shifter on a reception side of said single optical fiber.

In a still further possible embodiment of the method according to the first aspect of the present invention, the frequency shift is realized by an IQ Mach-Zehnder modulator.

In a further possible alternative embodiment of the method according to the first aspect of the present invention, the frequency shift is realized by four-wave mixing in a highly non-linear fiber.

In a still further possible embodiment of the method according to the first aspect of the present invention, the frequency shift is realized by cascaded frequency shifting using a Chi2 non-linearity in periodically poled lithium niobate.

In a further possible embodiment of the method according to the first aspect of the present invention, the frequency shift is adjusted in response to a control signal received from a network management system.

In a still further possible embodiment of the method according to the first aspect of the present invention, the transmission wavelength division multiplexed data channels are provided by transmit ports of multiple transponders and multiplexed or coupled to provide a first frequency spectrum forming a transponder frequency grid with frequency gaps between the transmission wavelength division multiplexed data channels.

In a further possible embodiment of the method according to the first aspect of the present invention, the frequency shifted transmission wavelength division multiplexed data channels and the frequency shifted reception wavelength division multiplexed data channels are combined to provide a second frequency spectrum forming a fiber frequency grid without frequency gaps between the wavelength division multiplexed data channels on said single optical fiber.

In a further possible embodiment of the method according to the first aspect of the present invention, a frequency distance between two adjacent transmission wavelength division multiplexed data channels in the first frequency spectrum is at least twice the frequency distance between a transmission wavelength division multiplexed data channel and a reception wavelength division multiplexed data channel in the second signal spectrum on the single optical fiber.

The invention further provides according to a further aspect a SFW-apparatus for enabling a single fiber-working, SFW, where data is transportable through a single optical fiber, SOF, said SFW-apparatus comprising:

an optical transponder interface adapted to provide transmission wavelength division multiplexed data channels and reception wavelength division multiplexed data channels having the same frequency grid with frequency gaps between the WDM data channels, a frequency shifter adapted to perform frequency shifting on the transmission wavelength division multiplexed data channels and/or the reception wavelength division multiplexed data channels to avoid a spectral overlap between the transmission wavelength division multiplexed data channels and the reception wavelength division multiplexed data channels, and an optical combiner adapted to combine the frequency shifted transmission wavelength division multiplexed data channels and the frequency shifted reception wavelength division multiplexed data channels for the single optical fiber.

In a possible embodiment of the SFW-apparatus according to the second aspect of the present invention, the frequency shift is realized by an IQ Mach-Zehnder modulator, by four-wave mixing in a highly non-linear fiber and/or by cascaded frequency shifting using Chi2 nonlinearity in periodically poled lithium niobate.

The invention further provides according to a third aspect an optical network comprising network nodes connected to each other via a single optical fiber, SOF, wherein each network node of said optical network comprises an SFW-apparatus according to the second aspect of the present invention.

BRIEF DESCRIPTION OF THE FIGURES

In the following, embodiments of the different aspects of the present invention are described in more detail with reference to the enclosed figures.

DETAILED DESCRIPTION OF EMBODIMENTS

Figure 7:
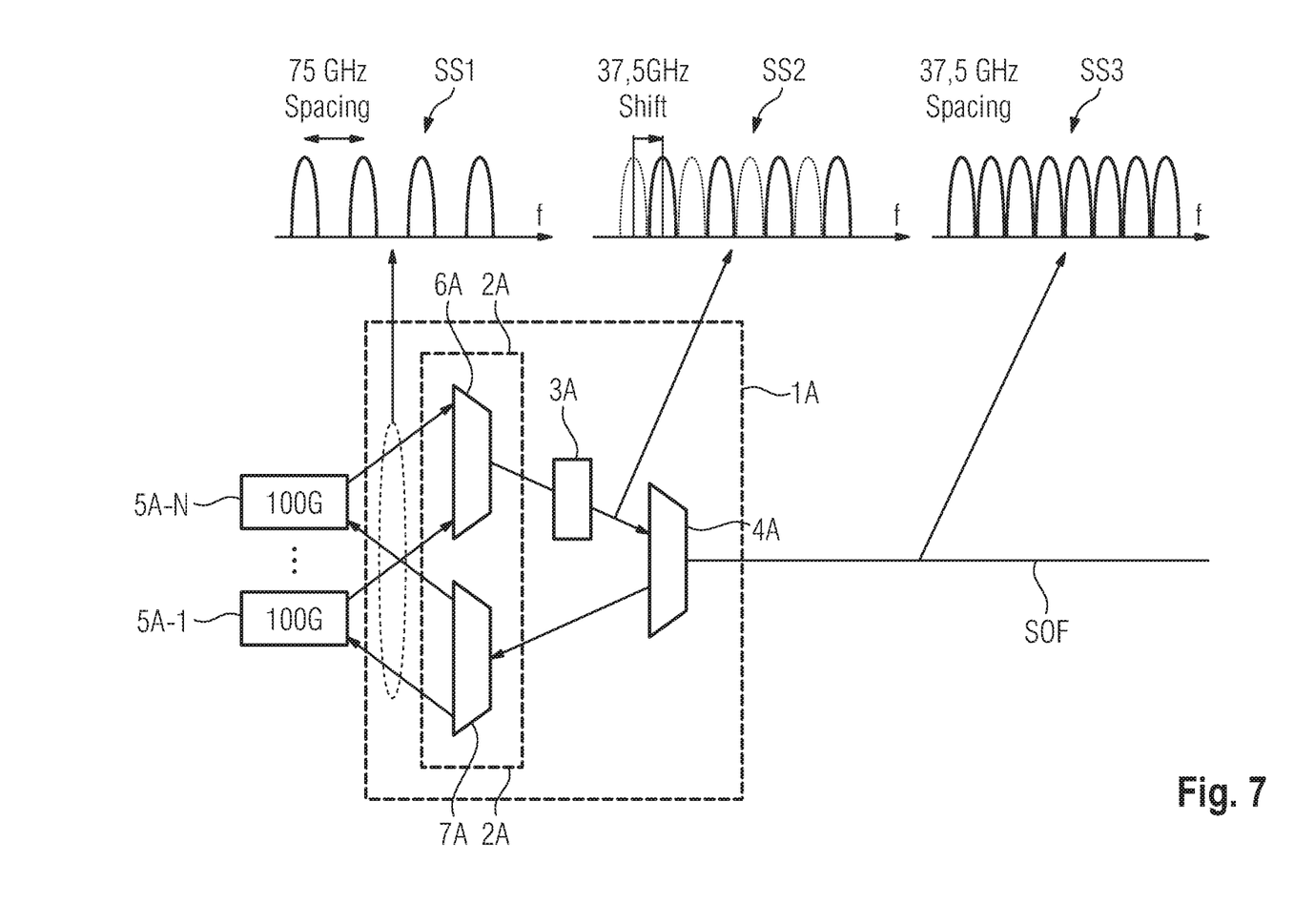
FIG. 7 shows a flowchart of an exemplary embodiment of a method for transporting data through a single optical fiber according to an aspect of the present invention.

The method for transporting data through a single optical fiber SOF performed by a method according to the present invention comprises several main steps. As illustrated in FIG. 7, the method can comprise in a possible embodiment four main steps S1, S2, S3, S4.

Figure 1:
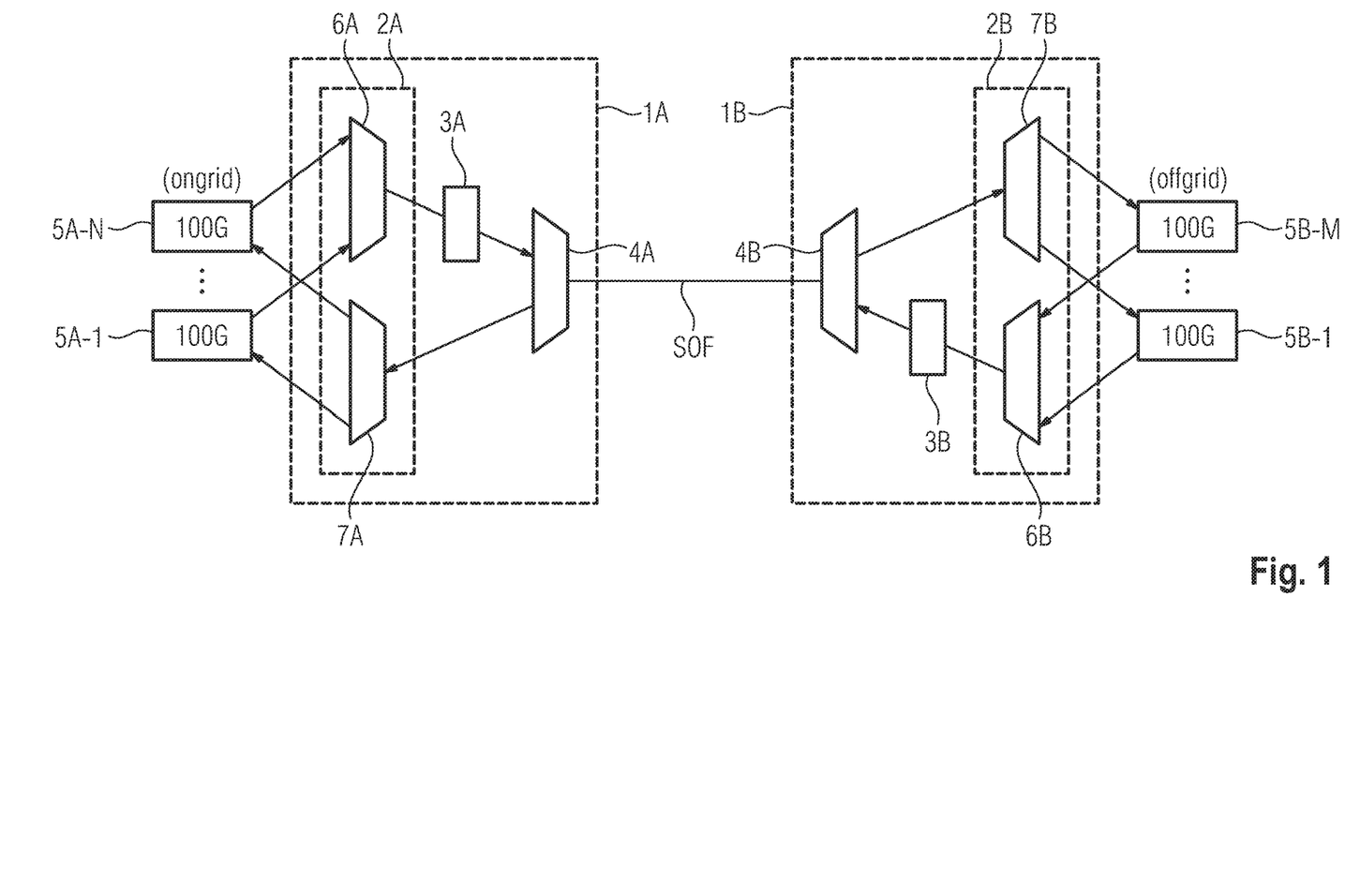
FIG. 1 shows a diagram for illustrating a first possible embodiment of an SFW-apparatus for enabling a single fiber-working according to an aspect of the present invention.

In a first step S1, transmission, Tx, wavelength division multiplexed, WDM, data channels are provided as well as reception, Rx, wavelength division multiplexed, WDM, data channels having the same frequency grid with frequency gaps between the WDM data channels as also shown in FIG. 1 of the illustrated embodiment of the SFW-apparatus 1.

In a further step S2 as shown in the flowchart of FIG. 7, the Tx WDM data channels and/or the Rx WDM data channels are frequency shifted to avoid a spectral overlap between the transmission WDM data channels and the Rx WDM data channels. A frequency shift can be realized in different ways. In a possible embodiment, the frequency shift can be realized by an IQ Mach-Zehnder modulator. In an alternative embodiment, the frequency shift is realized by four-wave mixing in a highly non-linear fiber. In a still further alternative embodiment, the frequency shift can be realized by cascaded frequency shifting using a Chi2 nonlinearity in periodically poled lithium niobate. In a possible embodiment, the frequency shift can be performed in response to a control signal received from a network management system. In a possible embodiment, the transmission wavelength division multiplexed data channels and the reception wavelength division multiplexed data channels can be frequency shifted by a frequency shift of at least the Nyquist spectral bandwidth of the respective WDM data channels.

In a further step S3 as shown in the flowchart of FIG. 7, the frequency shifted transmission wavelength division multiplexed data channels and the frequency shifted reception wavelength division multiplexed data channels are combined. In a possible embodiment, the frequency shifted Tx WDM data channels and the frequency shifted Rx WDM data channels are combined by interleaving the frequency shifted transmission wavelength division multiplexed data channels and the frequency shifted reception wavelength division multiplexed data channels. The frequency shifted Tx WDM data channels and the frequency shifted Rx WDM data channels can be combined by coupling the frequency shifted Tx WDM data channels and the frequency shifted Rx WDM data channels by means of a passive optical interleaver or by means of a passive optical coupler.

After having combined the frequency shifted Tx WDM data channels and the frequency shifted Rx WDM data channels in step S3, data is transported via the combined WDM data channels in opposite directions through the single optical fiber SOF in step S4 as illustrated in FIG. 7 (signal spectrum SS3).

In a possible embodiment, the single fiber-working, SFW, apparatus 1 according to an aspect of the present invention enables a single fiber-working SFW where data is transportable through a single optical fiber SOF which can be connected to conventional transponders, in particular to dual fiber-working, DFW, 100G+ transponders as illustrated in the embodiments shown in FIGS. 1 to 5.

Figure 6:
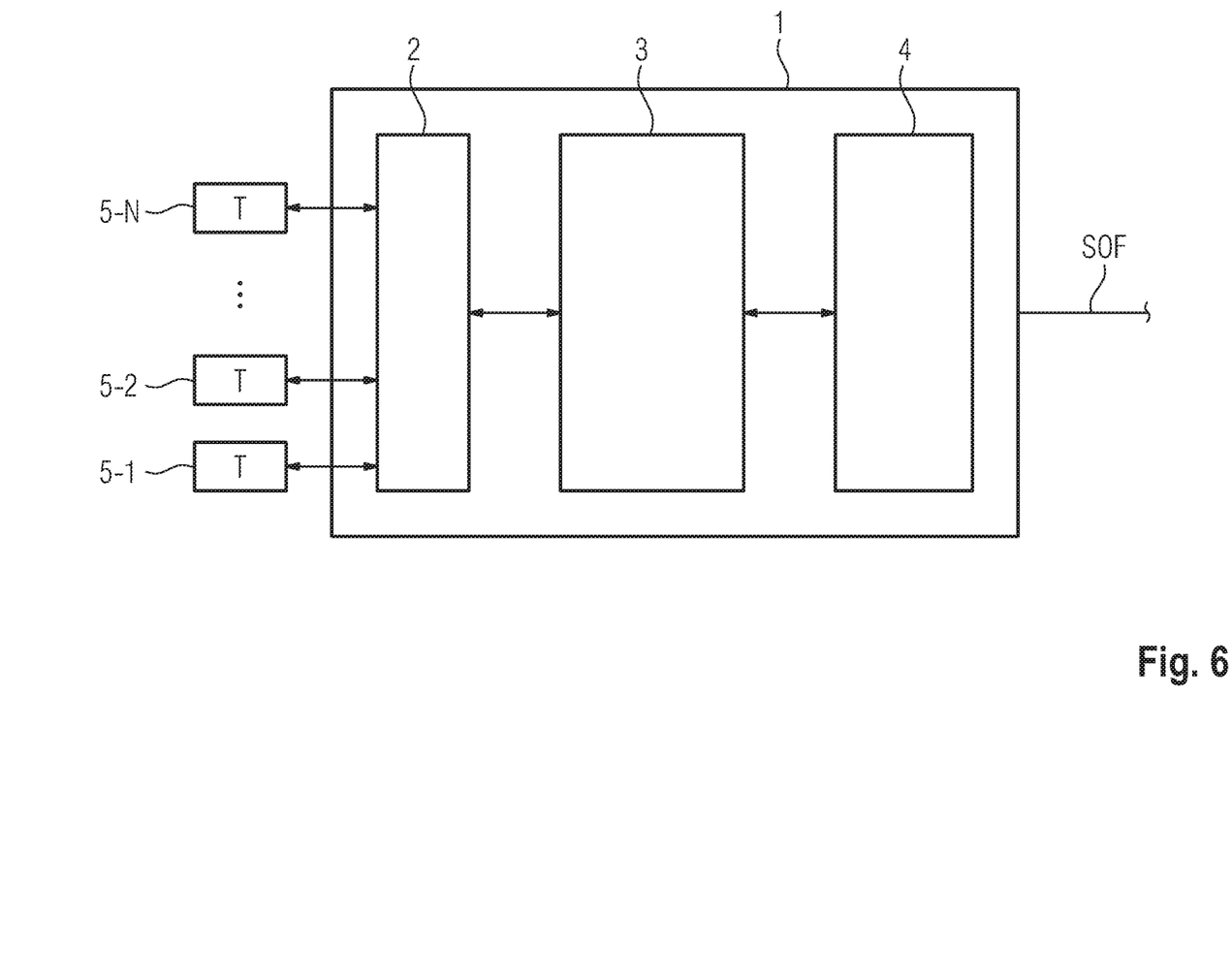
FIG. 6 shows a schematic block diagram of a possible exemplary embodiment of an SFW-apparatus according to an aspect of the present invention.

As shown in the block diagram of FIG. 6, an SFW-apparatus 1 for enabling single fiber-working, SFW, according to an aspect of the present invention can comprise in the illustrated embodiment three main units. The SFW-apparatus 1 comprises in the illustrated embodiment of FIG. 6 an optical transponder interface 2, a frequency shifter 3 and an optical combiner 4.

The optical transponder interface 2 is adapted to provide transmission, Tx, wavelength division multiplexed, WDM, data channels and reception, Rx, wavelength division multiplexed, WDM, data channels having the same frequency grid with frequency gaps between the WDM data channels.

The frequency shifter 3 of the SFW-apparatus 1 as shown in FIG. 6 is adapted to perform frequency shifting of the Tx WDM data channels and/or the Rx WDM data channels to avoid a spectral overlap between the Tx WDM data channels and the Rx WDM data channels.

The SFW-apparatus 1 further comprises in the illustrated embodiment an optical combiner 4 adapted to combine the frequency shifted Tx WDM data channels and the frequency shifted Rx WDM data channels for the single optical fiber, SOF, as shown in FIG. 6.

The optical transponder interface 2 of the SFW-apparatus 1 can be connected to a number of transponders 5-1, 5-2 . . . 5-n as shown in FIG. 6. The number of transponders 5-i connectable to the optical transponder interface can vary. In a possible embodiment, the transponders 5-i comprise DFW 100G transponders.

The Tx WDM data channels are provided by transmit ports of the multiple transponders 5-i and are multiplexed or coupled to provide a first frequency spectrum forming a transponder frequency grid with frequency gaps between the transmission wavelength division multiplexed data channels. Accordingly, at the optical transponder interface 2, the Tx WDM data channels comprise a transponder frequency grid with frequency gaps between the Tx WDM data channels. In the illustrated example of FIG. 1, the transponder frequency grid comprises frequency gaps with a 75 GHz spacing between the transmission WDM data channels as also illustrated as signal spectrum SS1 in FIG. 7. Other spacings are possible, e.g. 50 GHz spacings between the data channels. The transmission wavelength division multiplexed data channels with multiple transponders can be multiplexed or coupled to provide a first frequency spectrum (ongrid) with sufficient frequency gaps between the transmission WDM data channels.

In the illustrated system of FIG. 1, a single optical fiber SOF connects two SFW-apparatus 1A, 1B with each other. An SFW-apparatus can exchange bidirectly data via the SOF fiber. To both SFW-apparatuses 1A, 1B, a number of transponders can be connected as illustrated in FIG. 1. In the illustrated embodiment of FIG. 1, both apparatuses 1A, 1B comprise a 75 GHz AWG (Arrayed Waveguide Grating) forming part of the optical transponder interface 2 of the apparatuses 1A, 1B. A first AWG 6A can be used as a multiplexer and a second AWG 7A can be used as a demultiplexer. In the illustrated embodiment of FIG. 1, the WDM data channels of the transponder frequency grid having frequency gaps between the WDM data channels are shifted by a wavelength shifter 3A to avoid a spectral overlap between the Tx WDM data channels received from the transmit ports of the transponders 5A-i and the Rx WDM data channels received by the receive ports of the transponders 5A-i. The Tx WDM data channels and the Rx WDM data channels transport data through the single optical fiber SOF in opposite directions. In a possible embodiment, the wavelength shifter 3A may shift the Tx WDM data channels by 37.5 GHz, i.e. half the frequency gap between the WDM Tx data channels as also shown as signal spectrum SS2 in FIG. 7. Then, the frequency shifted Tx WDM data channels which have been frequency shifted by the frequency shifter 3A of the SFW-apparatus 1A are combined by an optical combiner 4A of the SFW-apparatus 1A with the frequency shifted Rx WDM data channels to provide a frequency spectrum SS3 as shown in FIG. 7 forming a fiber frequency grid without frequency gaps between the WDM data channels, i.e. the WDM Tx data channels and the WDM Rx data channels, on the single optical fiber SOF. In a possible implementation, the combiner can comprise a 37.5 GHz interleaver. In the system shown in FIG. 1, the SFW-apparatus 1B on the other side of the single optical fiber SOF has the same structure as the SFW-apparatus 1A. The SFW-apparatus 1B comprises an AFW multiplexer 6B, an AFW demultiplexer 7B, a frequency shifter 3B and an optical combiner 4B. The frequency shifter 3B can also perform a wavelength or frequency shift of e.g. 37.5 GHz in the illustrated implementation. The optical combiner 4B comprises in a possible embodiment a 37.5 GHz interleaver.

In the illustrated embodiment of FIGS. 1, 7 the transmit and receive ports of the transponders 5-i can be multiplexed independently in 75 GHz AWGs to form a signal spectrum SS1 as shown in FIG. 7. The signals can be fed in a possible embodiment to a polarization diverse frequency shifter 3A. In a possible embodiment, all Tx WDM data channels are frequency shifted simultaneously to avoid a spectral overlap between the Tx WDM data channels and the Rx WDM data channels on the single optical fiber SOF. In a possible embodiment, the WDM data channels are frequency shifted with half the channel's spacing, e.g. 37.5 GHz. This can be performed by the polarization diverse frequency shifter 3A as shown in FIG. 7. Accordingly, the WDM data channels are shifted from ongrid to offgrid. The second signal spectrum SS2 shown in FIG. 7 shows the frequency shifted Tx WDM data channels shifted by 37.5 GHz, i.e. half the channel's spacing of the signal spectrum SS1. Then, the Tx and Rx data streams are merged together by a combiner with a 37.5 GHz interleaver resulting in a spectrum SS3 as shown in FIG. 7. This frequency spectrum SS3 forms a fiber frequency grid without frequency gaps between the WDM data channels on the single optical fiber SOF. Accordingly, the Tx WDM data channels and the Rx WDM data channels are located next to each other. In a possible implementation, 64 100G+ transponders 5-i can be multiplexed together in a C-band occupying 128 WDM data channels at a 37.5 GHz grid. On the far end of the single optical fiber SOF, the optical signal can be demultiplexed and frequency shifted again. In the embodiment shown in FIG. 1, no further shift is performed on the far end side so that the WDM data channels received by the transponders 5B-i are offgrid. The embodiment illustrated in FIG. 1 has the advantage that only one frequency shift is performed, however, it has the disadvantage that the transponders on the other remote side have to operate offgrid. By performing only one frequency shift on the transmission side, using the frequency shifter 3A, the penalty of the frequency shift is minimized. This penalty can comprise non-linear signal distortions and/or a noise penalty and/or linear signal distortion and/or spectral attenuation. Accordingly, to minimize the impact of the frequency shifting, only one frequency shifter is used per direction as illustrated in the embodiment of FIGS. 1, 7. In both directions of the system shown in FIG. 1, a frequency shifter 3A, 3B is located at the transmit side. With the illustrated configuration of FIG. 1, both directions comprise one frequency shifter resulting in a more equal performance in both directions. However, a disadvantage of the architecture illustrated in FIG. 1 is that it is more difficult to manage the system as the transponders on the different sides of the single optical fiber SOF operate at different frequency grids spaced e.g. by 37.5 GHZ apart. The WDM channels on the left side of FIG. 1 connected to the SFW-apparatus 1A may operate ongrid whereas the WDM channels on the right side of FIG. 1 connected to SFW-apparatus 1B are offgrid.

Figure 2:
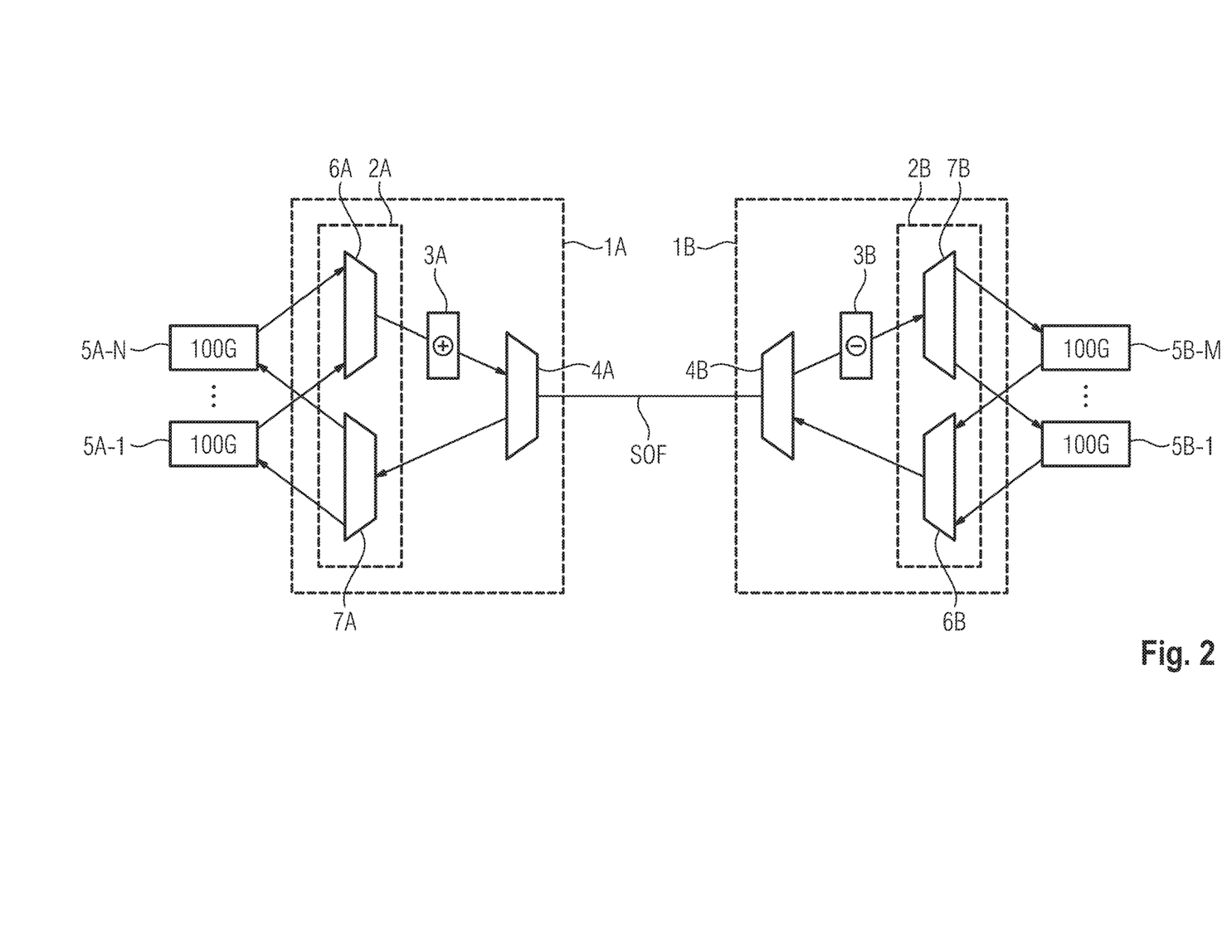
FIG. 2 shows a further diagram for illustrating a further possible exemplary embodiment of an SFW-apparatus for enabling a single fiber-working according to an aspect of the present invention.

In a further possible embodiment, the Tx WDM data channels can be frequency upshifted by a first frequency shifter 3A on a transmission side of the single optical fiber SOF to avoid spectral overlap between the Tx WDM data channels and the Rx WDM data channels. The Tx WDM data channels can be frequency upshifted positively with a predetermined frequency shift by a first frequency shifter 3A on the transmission side of the single optical fiber SOF and then frequency downshifted back negatively with the same frequency shift by a second frequency shifter 3B on the reception side of the single optical fiber SOF. This embodiment is illustrated in FIG. 2. The first frequency shifter 3A on the transmission side performs an upshift of the WDM data channels by e.g. 37.5 GHz.

The second frequency shifter 3B on the reception side performs a downshift by the same frequency shift by e.g. 37.5 GHz. The advantage of the embodiment illustrated in FIG. 2 is that the transponders 5 on both sides of the single optical fiber SOF use the same frequency grid (ongrid). This simplifies the management of the optical system significantly.

In a further possible embodiment, both the Tx WDM data channels and the Rx WDM data channels are frequency shifted relative to each other by a first frequency shifter 3A on a transmission side of a single optical fiber SOF and by a second frequency shifter 3B on a reception side of a single optical fiber SOF. In the illustrated embodiment of the system shown in FIG. 3, both SFW-apparatuses 1A, 1B comprise two frequency shifters, i.e. a first frequency shifter 3A for performing a positive frequency shift of the Tx WDM data channels and a negative frequency shift of the received WDM data channels. In the illustrated implementation of FIG. 3, the first positive frequency shifter 3A1 of the SFW-apparatus 1A performs a positive wavelength or frequency shift by 18.75 GHz, i.e. a quarter of the 75 GHz spacing of the original signal spectrum. The SFW-apparatus 1A further comprises a second negative frequency shifter 3A2 for performing a negative frequency shift of 18.75 GHz of the received Rx WDM data channels. The SFW-apparatus 1B on the remote side has the same structure comprising a negative frequency shifter 3B2 and a positive frequency shifter 3B1. The negative frequency shifter 3B2 performs a negative frequency shift of 18.75 GHz whereas the positive frequency shifter 3B1 performs a positive frequency shift of also 18.75 GHz in a possible embodiment. The embodiment shown in FIG. 3 has the advantage that the frequency shift itself is minimized. Further, since the transponders on both sides work ongrid, the management is simplified. However, the system of FIG. 3 requires a higher technical complexity since each SFW-apparatus 1 comprises a positive shifter and a negative frequency shifter.

Figure 3:
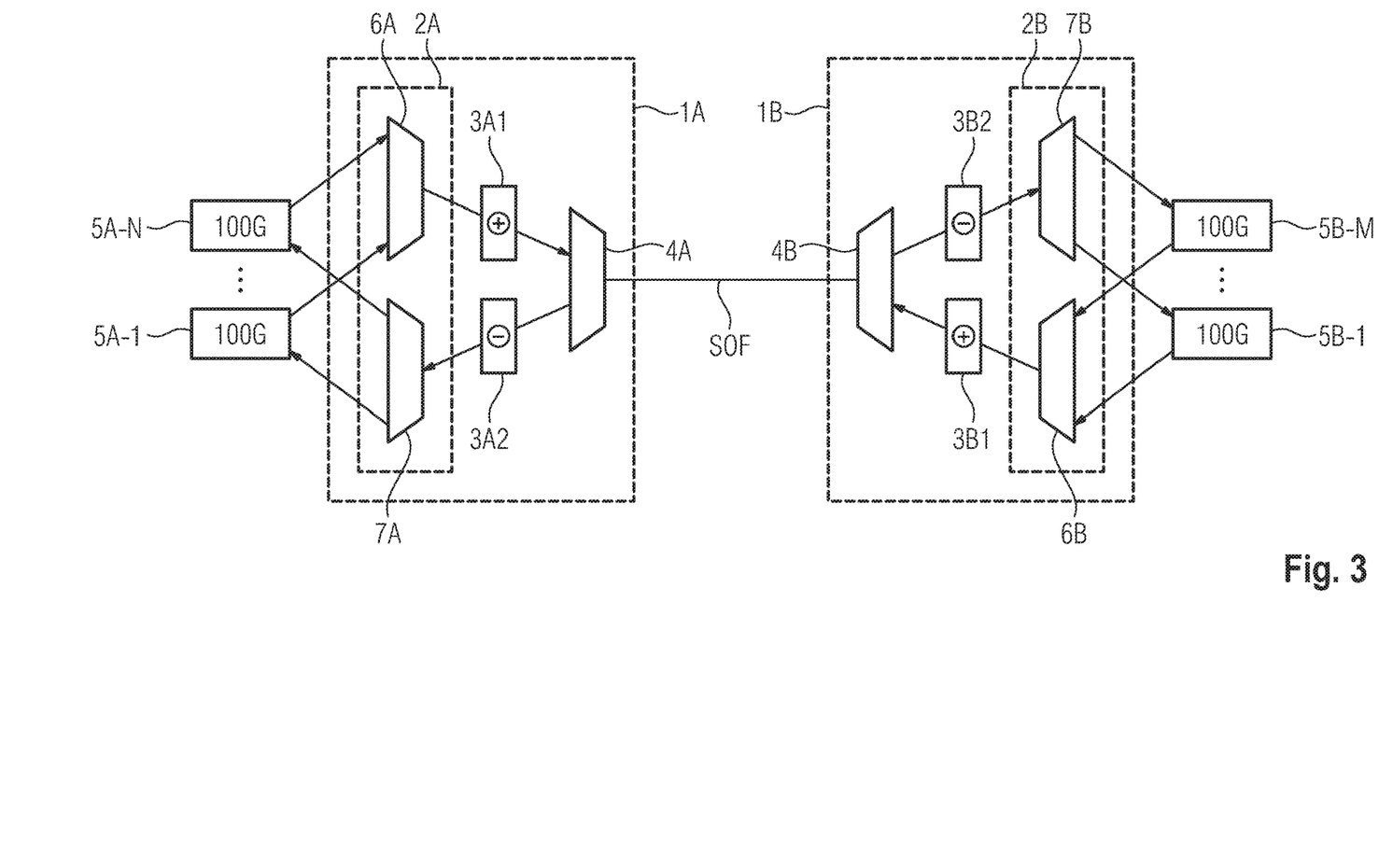
FIG. 3 shows a further diagram for illustrating an exemplary embodiment of an SFW-apparatus for enabling a single fiber-working according to an aspect of the present invention.

In a possible embodiment, the transmission system as illustrated in the embodiments of FIGS. 1, 2, 3 is configured to operate over a complete C-band with sufficient efficiency. The frequency shift can be performed in a possible embodiment by four-wave mixing FWM in a highly non-linear fiber HNLF. The main challenge of FWM in HNLF is that HNLF is bulky and that high optical powers are required for FWM generation. Similar high powers are required for Chi2 in a PPLN (Periodically Poled Lithium Niobate). In addition, PPLN forms a fragile device that needs to be heated. Accordingly, in a preferred embodiment, an IQ Mach-Zehnder modulator can be used for frequency shifting.

In the system according to the present invention, the frequency shift of the signal spectrum of one of the two opposite signal transport directions with half of the channel grid is performed before combining the channels. Thereby, the Tx and Rx WDM data channels are interleaved and are provided at the respective other side where the WDM data channels are converted back for detection. The architecture according to the present invention comprises a significant lower complexity than a system using separate local oscillators for each transponder. Further, high-density transmission systems have demanding space and power consumption requirements. Saving the need for a local oscillator eases the space and power requirements of the signal transport system. Further, most transmission systems are DFW systems and as such it is efficient to provide a separate transponder architecture for single fiber-working SFW. With the method according to the present invention, standard DFW transponders can be used on a single fiber-working, SFW, optical network. The method according to the present invention has the further advantage that it is completely independent of the modulation format, protocol and used data rates. Accordingly, the system implementing the method according to the present invention can be used for many generations of transponders.

Figure 4:
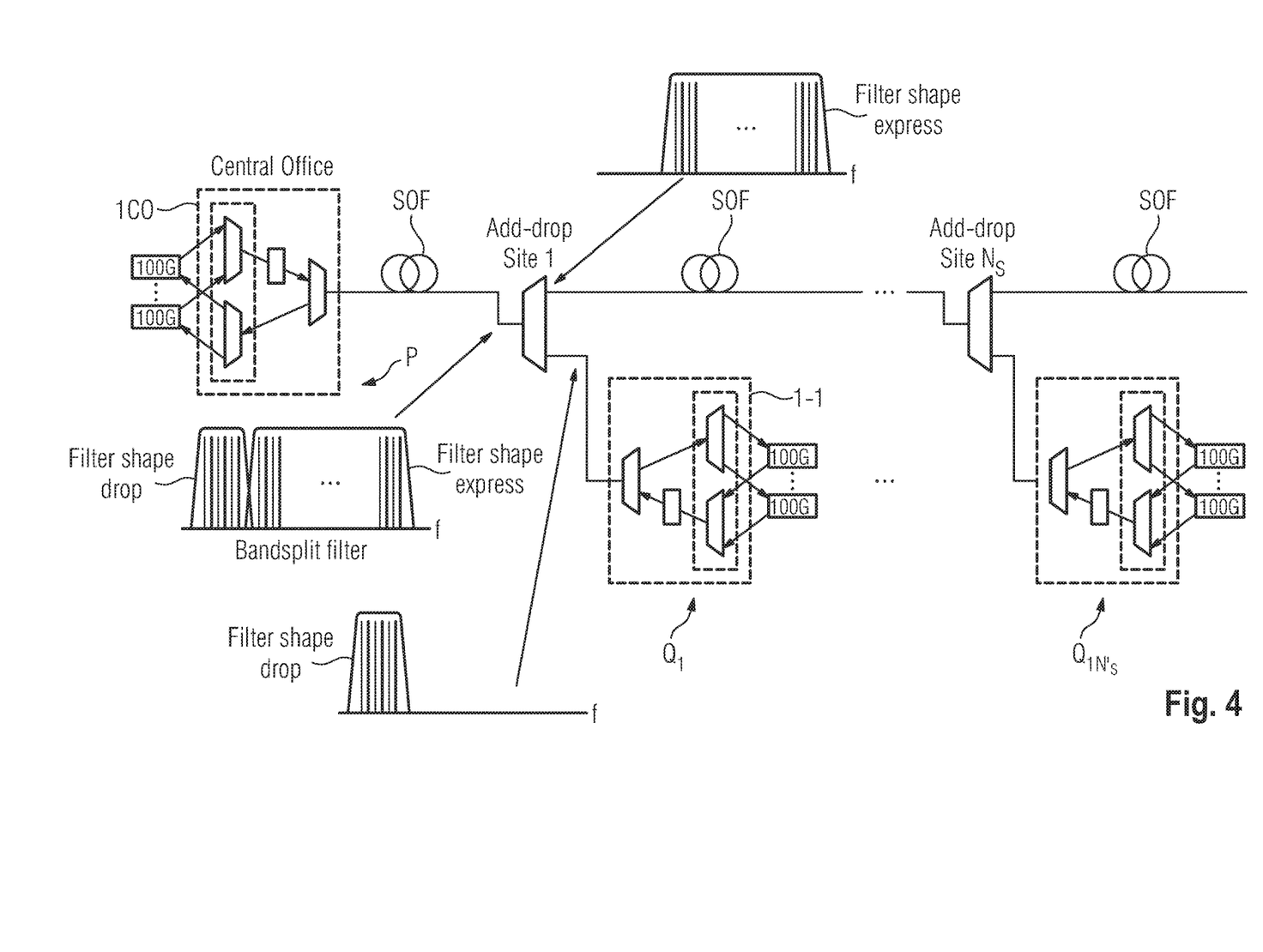
FIG. 4 shows a further circuit diagram for illustrating a possible exemplary embodiment of a system using an SFW-apparatus in a point-to-point connection.

FIG. 4 shows a schematic diagram for illustrating a possible application of the method and apparatus according to the present invention. The method and apparatus according to the present invention allows point-to-point communication from a point P to a point Q in a network. In the illustrated embodiment, the SFW-apparatus 1 according to the present invention is located in a central office and can be connected via a single optical fiber SOF to other points Q1 . . . Qn by means of associated add drop sites. The signal spectrum at the add drop site is illustrated in FIG. 4 as well.

Figure 5:
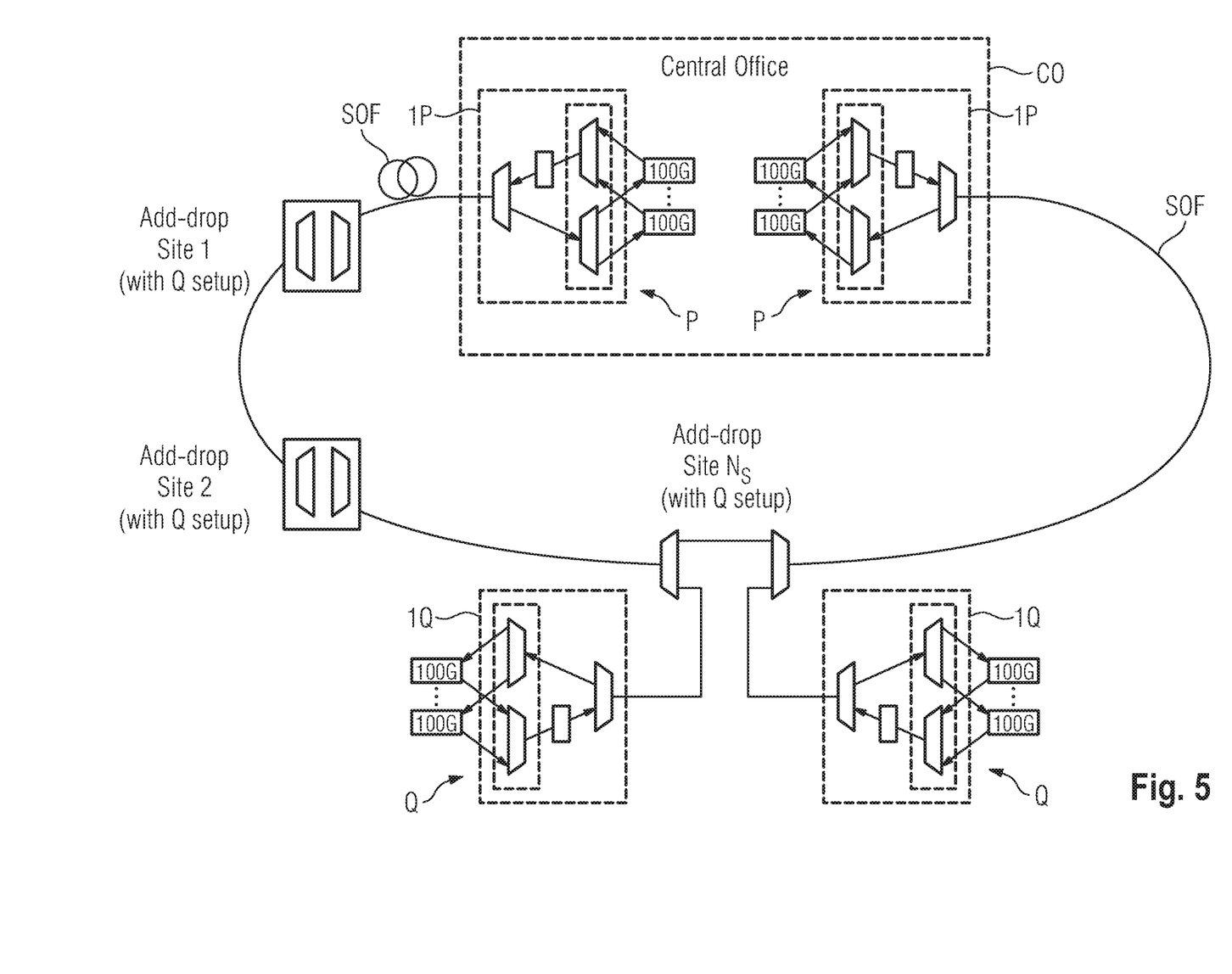
FIG. 5 illustrates a circuit diagram of a system using an SFW-apparatus in a ring network.

FIG. 5 shows a further use case for implementing the method and apparatus 1 according to the present invention. In the illustrated embodiment, the method can be used for connecting a central office with other nodes in a ring network. Each network node comprises at least one SFW-apparatus 1 connected by means of an add drop site as shown in FIG. 5.

In a possible embodiment of an optical network, the frequency shifting performed by the frequency shift units within the different SFW-apparatuses can be controlled by a network management system, for instance by means of a DCN (Dynamic Circuit Network) connection. The method and apparatus 1 according to the present invention can be used for a hub and spoke ring network or for linear add drop networks. The number of WDM channels and the spacing in the frequency's grid can vary depending on the use case.

REFERENCE SIGNS 1, 1A, 1 B SFW apparatus
2, 2a, 2B transponder interfaces
3, 3A, 3B frequency shifter
4, 4A, 4B optical combiner
5, 5A, 5B transponder
6A, 6B Arrayed waveguide grating AWG
7A, 7B Arrayed waveguide grating AWG

The invention claimed is:

1. A method for transporting data through a single optical fiber the method comprising the steps of:
   providing transmission of wavelength division multiplexed Tx-WDM data channels and reception of wavelength division multiplexed Rx-WDM data channels having the same frequency grid with frequency gaps between the WDM data channels;
   frequency shifting the Tx-WDM data channels and/or the Rx-WDM data channels to avoid spectral overlap between the Tx-WDM data channels and the Rx-WDM data channels;
   combining the frequency shifted Tx-WDM data channels and the frequency shifted Rx-WDM data channels; and
   transporting data via the combined WDM data channels through said single optical fiber (SOF) in opposite directions,
   wherein the frequency shifted Tx-WDM data channels and the frequency shifted Rx-WDM data channels are combined by interleaving the frequency shifted Tx-WDM data channels and the frequency shifted Rx-WDM data channels, and
   wherein the frequency shifted Tx-WDM data channels and the frequency shifted Rx-WDM data channels are combined by coupling the frequency shifted Tx-WDM data channels and the frequency shifted Rx-WDM data channels by means of a passive optical interleaver or a passive optical coupler.

2. The method according to claim 1 wherein the Tx-WDM data channels and the Rx-WDM data channels are frequency shifted with a frequency shift of at least the Nyquist spectral bandwidth of the respective WDM data channels.

3. The method according to claim 1 wherein all Tx-WDM data channels and/or all Rx-WDM data channels are frequency shifted simultaneously to avoid spectral overlap between the Tx-WDM data channels and the Rx-WDM data channels on said single optical fiber.

4. The method according to claim 1 wherein the Tx-WDM data channels and the Rx-WDM data channels are frequency shifted by a frequency shifter.

5. The method according to claim 1 wherein the Tx-WDM data channels are frequency upshifted by a frequency shifter on a transmission side of the single optical fiber to avoid spectral overlap between the Tx-WDM data channels and the Rx-WDM data channels.

6. The method according to claim 1 wherein the Tx-WDM data channels are frequency upshifted positively with a frequency shift by a first frequency shifter on a transmission side of said single optical fiber and frequency downshifted back negatively with the same frequency shift by a second frequency shifter on the reception side of said single optical fiber.

7. The method according to claim 1 wherein both the Tx-WDM data channels and the Rx-WDM data channels are frequency shifted relative to each other by a first frequency shifter on a transmission side of said single optical fiber and by a second frequency shifter on a reception side of said single optical fiber.

8. The method according to claim 1 wherein the frequency shift is realized by an IQ Mach-Zehnder modulator, by four-wave mixing in a highly non-linear fiber and/or by cascaded frequency shifting using a Chi2 non-linearity in periodically poled lithium niobate.

9. The method according to claim 1 wherein the frequency shift is adjusted in response to a control signal received from a network management system.

10. The method according to claim 1 wherein the Tx-WDM data channels are provided by transmit ports of multiple transponders and multiplexed or coupled to provide a first frequency spectrum forming a transponder frequency grid with frequency gaps between the Tx-WDM data channels.

11. The method according to claim 1 wherein the frequency shifted Tx-WDM data channels and the frequency shifted Rx-WDM data channels are combined to provide a second frequency spectrum forming a fiber frequency grid without frequency gaps between the WDM data channels on said single optical fiber.

12. The method according to claim 11 wherein a frequency distance between two adjacent Tx-WDM data channels in said first frequency spectrum is at least twice the frequency distance between a Tx-WDM data channel and an Rx-WDM data channel in said second signal spectrum on said single optical fiber.

13. An SFW-apparatus for enabling a single fiber working, SFW, where data is transportable through a single optical fiber, said SFW-apparatus comprising:
   an optical transponder interface adapted to provide transmission of wavelength division multiplexed Tx-WDM data channels and reception of wavelength division multiplexed Rx-WDM data channels having the same frequency grid with frequency gaps between the WDM data channels;
   a frequency shifter adapted to perform frequency shifting of the Tx-WDM data channels and/or the Rx-WDM data channels to avoid a spectral overlap between the Tx-WDM data channels and the Rx-WDM data channels;
   an optical combiner adapted to combine the frequency shifted Tx-WDM data channels and the frequency shifted Rx-WDM data channels for the single optical fiber,
   wherein the frequency shifted Tx-WDM data channels and the frequency shifted Rx-WDM data channels are combined by interleaving the frequency shifted Tx-WDM data channels and the frequency shifted Rx-WDM data channels, and
   wherein the frequency shifted Tx-WDM data channels and the frequency shifted Rx-WDM data channels are combined by coupling the frequency shifted Tx-WDM data channels and the frequency shifted Rx-WDM data channels by means of a passive optical interleaver or a passive optical coupler.

14. The SFW-apparatus according to claim 13 wherein the frequency shift is realized by an IQ Mach-Zehnder modulator, by four-wave mixing in a highly non-linear fiber and/or by cascaded frequency shifting using Chi2 non-linearity in periodically poled lithium niobate.

15. An optical network comprising network nodes connected to each other via a single optical fiber wherein each network node of said optical network comprises an SFW-apparatus comprising:
- an optical transponder interface adapted to provide transmission of wavelength division multiplexed Tx-WDM data channels and reception of wavelength division multiplexed Rx-WDM data channels having the same frequency grid with frequency gaps between the WDM data channels;
- a frequency shifter adapted to perform frequency shifting of the Tx-WDM data channels and/or the Rx-WDM data channels to avoid a spectral overlap between the Tx-WDM data channels and the Rx-WDM data channels;
- an optical combiner adapted to combine the frequency shifted Tx-WDM data channels and the frequency shifted Rx-WDM data channels for the single optical fiber,
- wherein the frequency shifted Tx-WDM data channels and the frequency shifted Rx-WDM data channels are combined by interleaving the frequency shifted Tx-WDM data channels and the frequency shifted Rx-WDM data channels, and
- wherein the frequency shifted Tx-WDM data channels and the frequency shifted Rx-WDM data channels are combined by coupling the frequency shifted Tx-WDM data channels and the frequency shifted Rx-WDM data channels by means of a passive optical interleaver or a passive optical coupler.

* * * * *